US008024011B2

(12) United States Patent
Yeh

(10) Patent No.: US 8,024,011 B2
(45) Date of Patent: Sep. 20, 2011

(54) METHOD AND APPARATUS FOR INTERCEPTING SIGNALS TO CHANGE THE RING MODE OF A MOBILE DEVICE

(75) Inventor: Ming-Fong Yeh, Taipei (TW)

(73) Assignee: Panasonic Corporation, Osaka (JP)

( * ) Notice: Subject to any disclaimer, the term of this patent is extended or adjusted under 35 U.S.C. 154(b) by 966 days.

(21) Appl. No.: 11/915,619

(22) PCT Filed: Jun. 2, 2006

(86) PCT No.: PCT/JP2006/311564
§ 371 (c)(1),
(2), (4) Date: Nov. 27, 2007

(87) PCT Pub. No.: WO2006/032338
PCT Pub. Date: Dec. 14, 2006

(65) Prior Publication Data
US 2009/0029742 A1    Jan. 29, 2009

(30) Foreign Application Priority Data
Jun. 6, 2005   (CN) .......................... 2005 1 0076502

(51) Int. Cl.
*H04B 1/38* (2006.01)
(52) U.S. Cl. .................. 455/567; 379/179; 379/207.08; 379/207.09; 379/207.16; 379/211.03; 379/252; 379/256; 379/375.01; 379/373.01; 379/373.02; 455/401; 455/456.1

(58) Field of Classification Search ............... 455/456.1, 455/567, 401; 370/179, 207.08, 207.09, 370/207.16, 211.03, 252, 256, 375.01, 373.01, 370/373.02
See application file for complete search history.

(56) References Cited

U.S. PATENT DOCUMENTS

| | | | |
|---|---|---|---|
| 6,671,370 | B1 | 12/2003 | Heinonen et al. |
| 6,718,175 | B1 | 4/2004 | Edstam |
| 2002/0058480 | A1 | 5/2002 | Ikeda |
| 2006/0002349 | A1 | 1/2006 | Demirhan |
| 2006/0202774 | A1 | 9/2006 | Hirano |

FOREIGN PATENT DOCUMENTS

| | | |
|---|---|---|
| EP | 1035748 | 9/2000 |
| EP | 1117245 | 7/2001 |
| GB | 2396779 | 6/2004 |

*Primary Examiner* — Kamran Afshar
*Assistant Examiner* — Khalid Shaheed
(74) *Attorney, Agent, or Firm* — Greenblum & Bernstein, P.L.C.

(57) ABSTRACT

A method for intercepting signals so as to change the ring mode of a mobile device includes the following steps. Initially, a signal about to enter a predetermined area is intercepted. Then, a specific ring mode is added to the signal according to contents of the signal. Next, the signal having the specific ring mode is sent to a mobile device located in the predetermined area. Subsequently, the mobile device uses the specific ring mode as the ring mode of the mobile device upon receipt of the signal. A device applying the method is also disclosed.

10 Claims, 7 Drawing Sheets

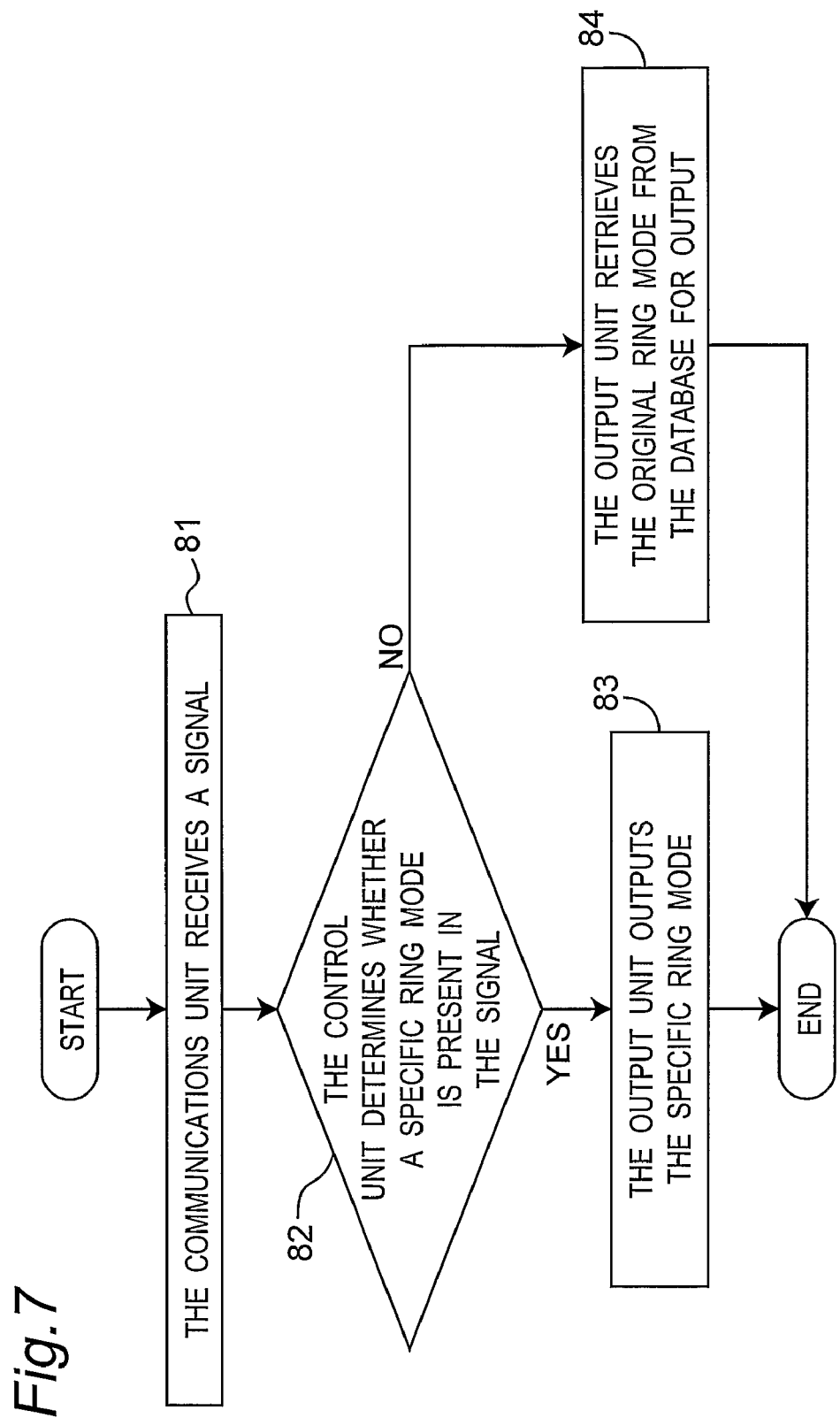

METHOD AND APPARATUS FOR INTERCEPTING SIGNALS TO CHANGE THE RING MODE OF A MOBILE DEVICE

TECHNICAL FIELD

The invention relates to a method for changing the ring mode of a mobile device, and a device for applying the method, more particularly to a method for changing the ring mode of a mobile device through signal interception, and a device applying the method.

BACKGROUND ART

Telephones have become an indispensable tool of communication between people. With the fast development of mobile communications technology, people nowadays can utilize a handset to communicate with others at any time, and meanwhile, Internet Protocol-based (IP-based) telephony, known as Voice over IP (VoIP), is starting to gain ground in the field of mobile communications. However, traditional mobile phones and IP-based mobile phones have a common problem that needs to be solved, that is, how disturbances caused by the ringing sounds of incoming calls can be avoided when a mobile phone user is in an environment (such as a hospital, a conference room, or a theater) where disturbances are considered annoying.

Thus, the European patent publication no. EP1035748 A1, entitled "Switching a mobile terminal to a silent ring mode," proposes a method for switching a mobile terminal to a silent ring mode by means of periodically broadcasting a good manner signal (i.e., a request for switching the ring mode) to a mobile terminal in a predetermined area to switch the ring mode of the mobile terminal.

However, the aforesaid patent has the following drawbacks. First, supposing the mobile terminal has received a call just prior to receiving the good manner signal in the predetermined area, the mobile terminal will still use its original ring mode. Second, settings of the mobile terminal have to be changed in order to achieve the intended objective of the aforesaid patent.

Furthermore, referring to FIG. 1, a conventional way of achieving the objective of preventing disturbance caused to a predetermined area 3 (i.e., the environment to be protected from disturbance) by a mobile device 21 that is located in the predetermined area 3 is described as follows. First, a caller 10 outside the predetermined area 3 calls the mobile device 21 of a callee 20 using an originating mobile device 11. The telephone signal is transmitted in a network telephony-adopted form to a hub 25. Then, the hub 25 broadcasts the telephone signal to a plurality of access points (AP) 22, 23, 24 within the predetermined area 3. Next, as indicated by a signal direction 29, the mobile device 21 can receive the telephone signal through the access point 22. However, in order to avoid disturbance caused to the predetermined area 3 by a ringing sound that is generated when the mobile device 21 receives the telephone signal, the callee 20 must manually change the ring mode of the mobile device 21 to a silent or vibration mode, which is inconvenient to the callee 20 and therefore needs to be efficiently resolved.

DISCLOSURE OF INVENTION

Therefore, an objective of the present invention is to provide a method for intercepting signals so as to change the ring mode of a mobile device, which utilizes an interception mechanism to intercept a signal about to enter a predetermined area and to add a specific ring mode thereto so as to change the ring mode of a mobile device located in the predetermined area.

Accordingly, the method for intercepting signals so as to change the ring mode of a mobile device of the present invention includes the following steps. Initially, a signal about to enter a predetermined area is intercepted. Then, according to contents of the signal, a specific ring mode is added to the signal. Next, the signal having the specific ring mode is sent to a mobile device located in the predetermined area. Subsequently, the mobile device uses the specific ring mode as the ring mode of the mobile device upon receipt of the signal.

Another objective of the present invention is to provide another method for intercepting signals so as to change the ring mode of a mobile device, which utilizes an interception mechanism to intercept a signal about to enter a predetermined area and to add a specific ring mode together with authentication information thereto so as to change the ring mode of a mobile device located in the predetermined area through an authentication process.

Accordingly, this another method for intercepting signals so as to change the ring mode of a mobile device of the present invention includes the following steps. Initially, a signal about to enter a predetermined area is intercepted. Then, according to contents of the signal, a specific ring mode and authentication information are added to the signal. Thereafter, the signal having the specific ring mode and the authentication information are sent to a mobile device located in the predetermined area. Next, the mobile device verifies the authentication information. Subsequently, when the signal passes the verification of the mobile device, the mobile device uses the specific ring mode as the ring mode of the mobile device upon receipt of the signal.

Still another objective of the present invention is to provide a signal filtering device, which utilizes an interception mechanism to intercept a signal about to enter a predetermined area and to add a specific ring mode thereto so as to change the ring mode of a mobile device located in the predetermined area.

Accordingly, the signal filtering device of the present invention is adapted for intercepting a signal about to enter a predetermined area so as to change the ring mode of a mobile device located in the predetermined area, wherein the signal filtering device includes an interception unit, an adding unit, and a filtering unit. The interception unit is used for intercepting the signal and sending the signal to the mobile device. The adding unit is used to add a specific ring mode to the signal, wherein the specific ring mode is used by the mobile device as the ring mode of the mobile device upon receipt of the signal. The filtering unit is used to determine whether it is necessary to send the signal to the adding unit according to the contents of the signal from the interception unit.

Yet another objective of the present invention is to provide a mobile device for receiving a signal having a specific ring mode.

Accordingly, the mobile device of the present invention includes a communications unit, a control unit, and an output unit. The communications unit is used for receiving the signal. The control unit is used for receiving the signal from the communications unit and for determining whether the specific ring mode is present in the signal. The output unit is used for outputting the specific ring mode.

BRIEF DESCRIPTION OF DRAWINGS

FIG. 7 is a flowchart to illustrate a preferred embodiment of an operational flow of the mobile device.

BEST MODE FOR CARRYING OUT THE INVENTION

Figure 1:
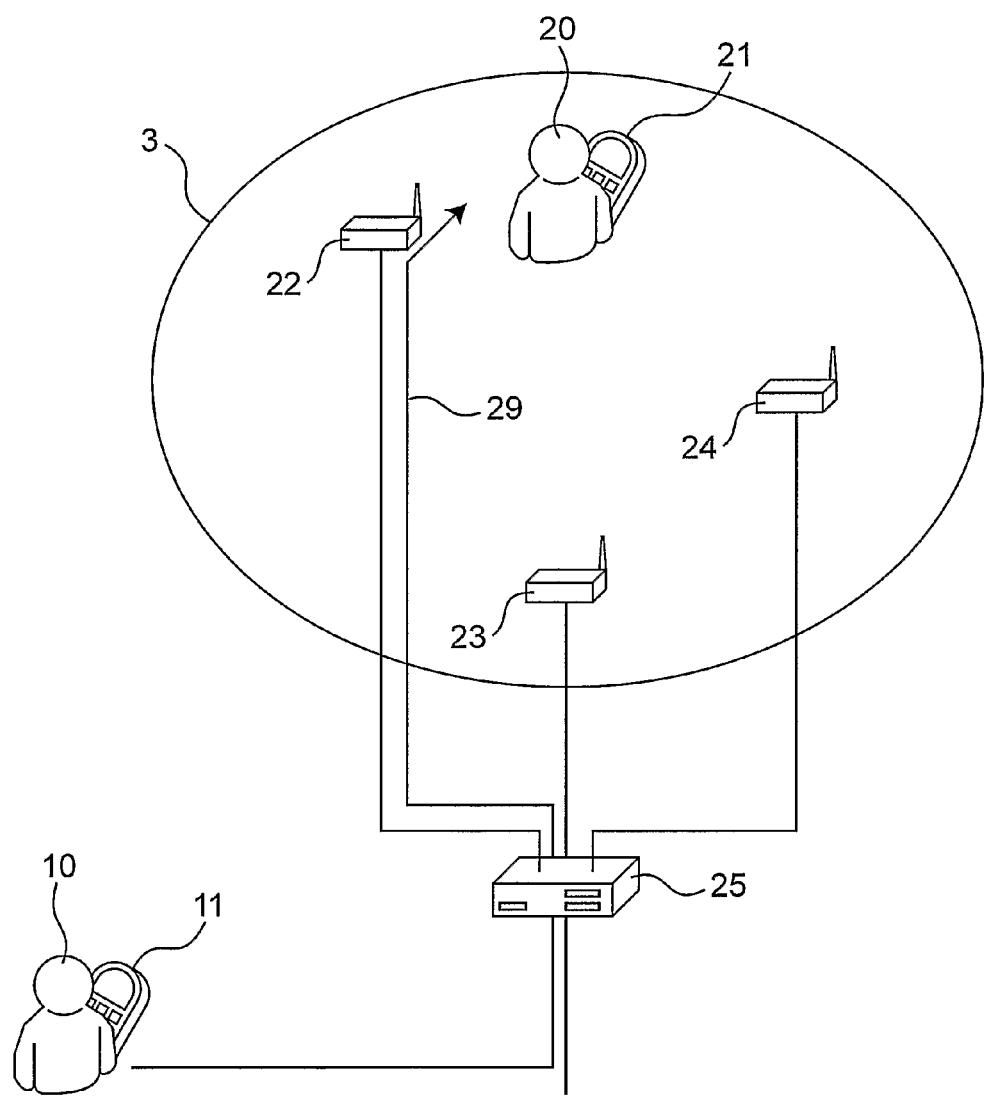
FIG. 1 is a schematic diagram to illustrate a caller outside a predetermined area making an Internet call to a callee located in the predetermined area.
Figure 2:
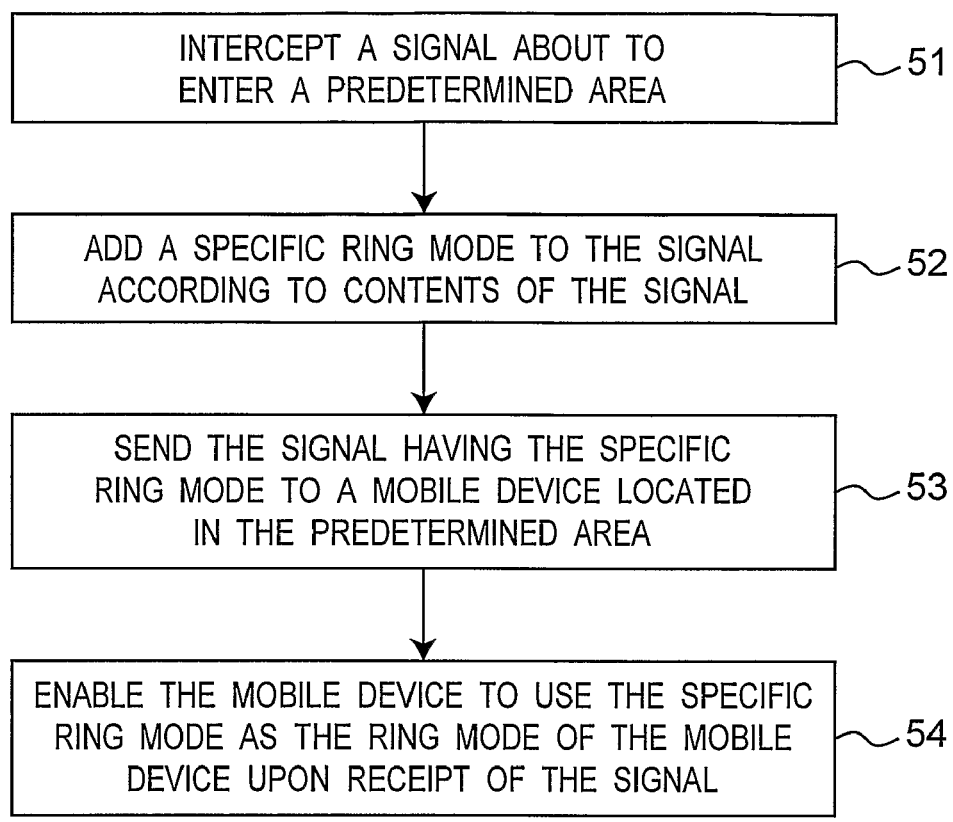
FIG. 2 is a flowchart to illustrate a preferred embodiment of a method for intercepting signals so as to change the ring mode of a mobile device according to the present invention.

Referring to FIG. 2, a method for intercepting signals so as to change the ring mode of a mobile device according to the present invention is shown to include the following steps. Initially, in step 51, a signal about to enter a predetermined area is intercepted. Then, in step 52, a specific ring mode is added to the signal according to contents of the signal. Next, in step 53, the signal having the specific ring mode is sent to a mobile device located in the predetermined area. Subsequently, in step 54, the mobile device uses the specific ring mode as the ring mode of the mobile device upon receipt of the signal.

Figure 3:
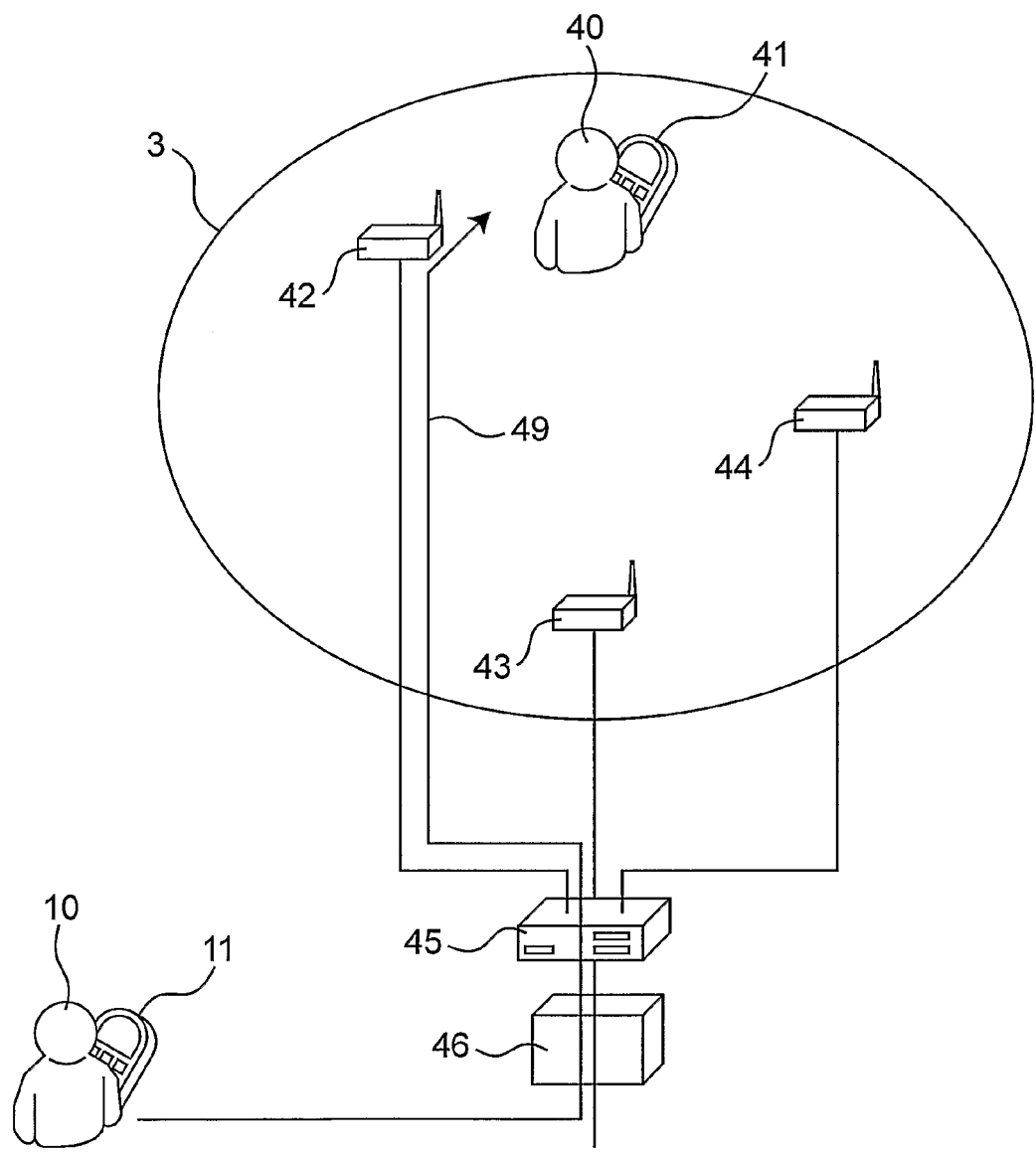
FIG. 3 is a schematic diagram to illustrate a preferred embodiment of a communication architecture applying the method of the present invention.

Referring to FIG. 3, the preferred embodiment of a communications architecture applying the method of the present invention shown in FIG. 2 will now be described as follows. Initially, a caller 10 who is located outside a predetermined area 3 (which represents a hospital, a conference room, or a theater that should be protected from noise disturbance in this embodiment) sends a telephone signal through an originating mobile device 11. Then, the telephone signal is transmitted over the Internet (not shown) in a network telephony-adopted form. Next, before entering a hub 45, the signal will be intercepted by a signal filtering device 46. Subsequently, the signal filtering device 46 will add a specific ring mode (which represents a silent vibration mode in this embodiment) to the signal. Thereafter, the signal filtering device 46 transmits the signal to the hub 45. Then, the hub 45 will broadcast the signal to a plurality of access points 42, 43, 44 located in the predetermined area 3. Next, as indicated by a signal direction 49, a mobile device 41 used by a callee 40 can receive the telephone signal through the access point 42. Accordingly, the mobile device 41 can use the specific ring mode of silent vibrations in the signal as the actual inputted ring mode, thereby achieving the objective of preventing disturbance to the predetermined area 3.

Figure 4:
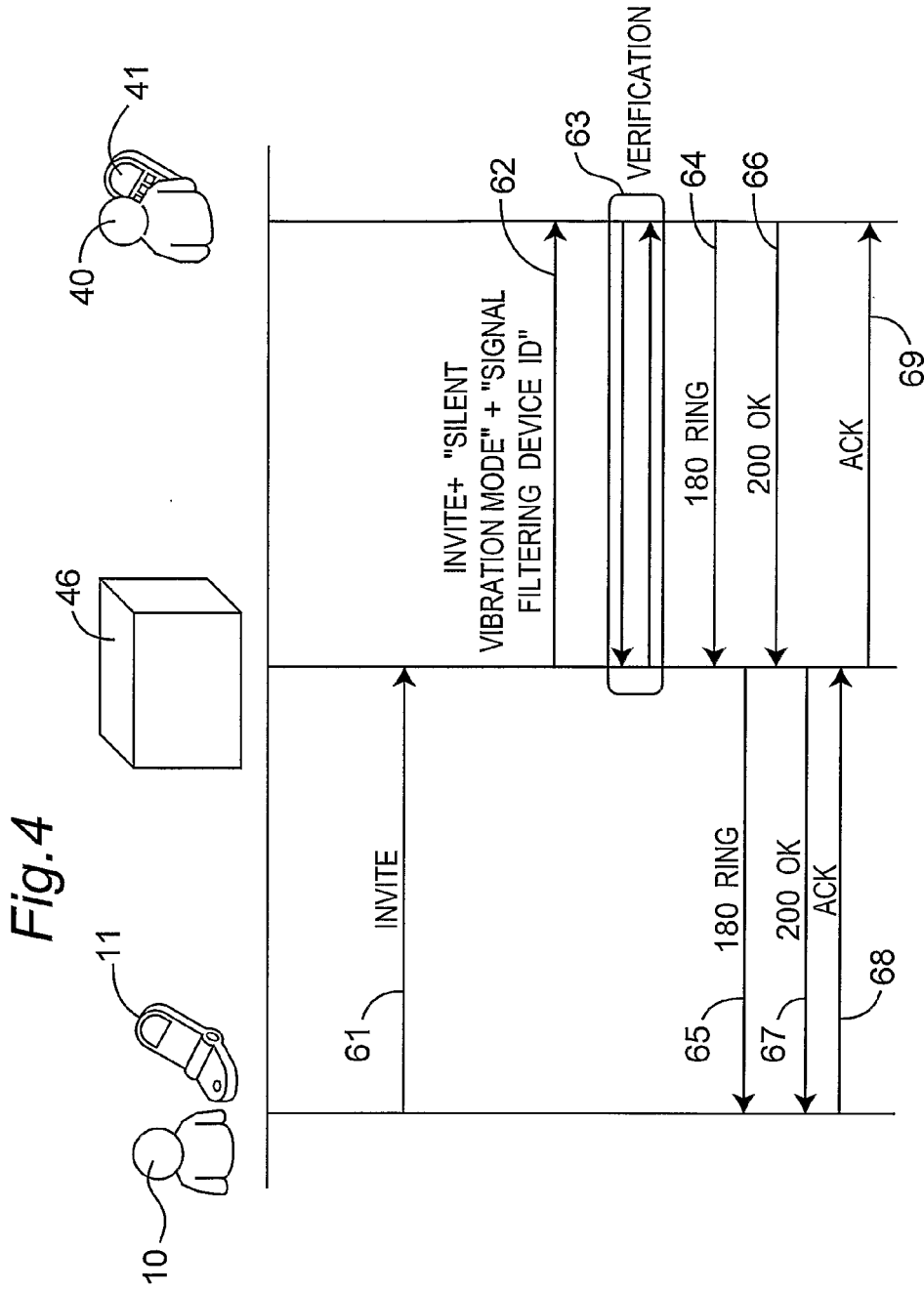
FIG. 4 is an operational flow diagram to illustrate a preferred embodiment of an operational message flow of the present invention.

With further reference to the operational message flow of the above-described preferred embodiment of the present invention as shown in FIG. 4, to enable smooth operation of the present invention, a disturbance-preventing service of the signal filtering device 46 needs to be activated at the start. The embodiment shown in FIG. 4 is implemented based on the Session Initiation Protocol (SIP), but is not limited thereto. For instance, the H.323 protocol can also be utilized to practice the present invention. Then, as shown in procedure 61, when the caller 10 uses the originating mobile device 11 to make a phone call, the mobile device 11 will issue a SIP-based INVITE request. Then, the INVITE request will be intercepted by the signal filtering device 46 after being transmitted over the Internet. Next, the signal filtering device 46 will add the specific ring mode of silent vibrations and an ID (authentication information) of the signal filtering device 46 to the INVITE request. Subsequently, in procedure 62, the INVITE request is transmitted to the mobile device 41 in the predetermined area 3.

Thereafter, as shown in procedure 63, the mobile device 41 verifies whether the INVITE request was issued by the legitimate signal filtering device 46 according to the authentication information in the INVITE request. If the INVITE request passes the verification by the mobile device 41, the mobile device 41 will notify the callee 40 of the incoming call using the specific ring mode of silent vibrations. Then, as shown in procedure 64, the mobile device 41 issues a SIP-based 180 Ring message to the signal filtering device 46 to indicate that the mobile device 41 is in the silent vibration ring mode. Next, in procedure 65, the signal filtering device 46 forwards the 180 Ring message to the originating mobile device 11. Then, the callee 40 decides whether or not to answer the phone call according to the telephone number of the caller 10. If the callee 40 answers the call, in procedure 66, the mobile device 41 issues a SIP-based 200 OK message to the signal filtering device 46 to indicate that the callee 40 has answered the call. Next, in procedure 67, the signal filtering device 46 forwards the SIP-based 200 OK message to the originating mobile device 11. Subsequently, as shown in procedure 68, the originating mobile device 11 issues a SIP-based ACK message to the signal filtering device 46. Thereafter, in procedure 69, the signal filtering device 46 forwards the ACK message to the mobile device 41 in the predetermined area 3. Thus, by using the signal filtering device 46 to intercept signals and change the ring mode, the originating mobile device 11 and the mobile device 41 that is in the predetermined area 3 can conduct a call session smoothly.

Figure 5:
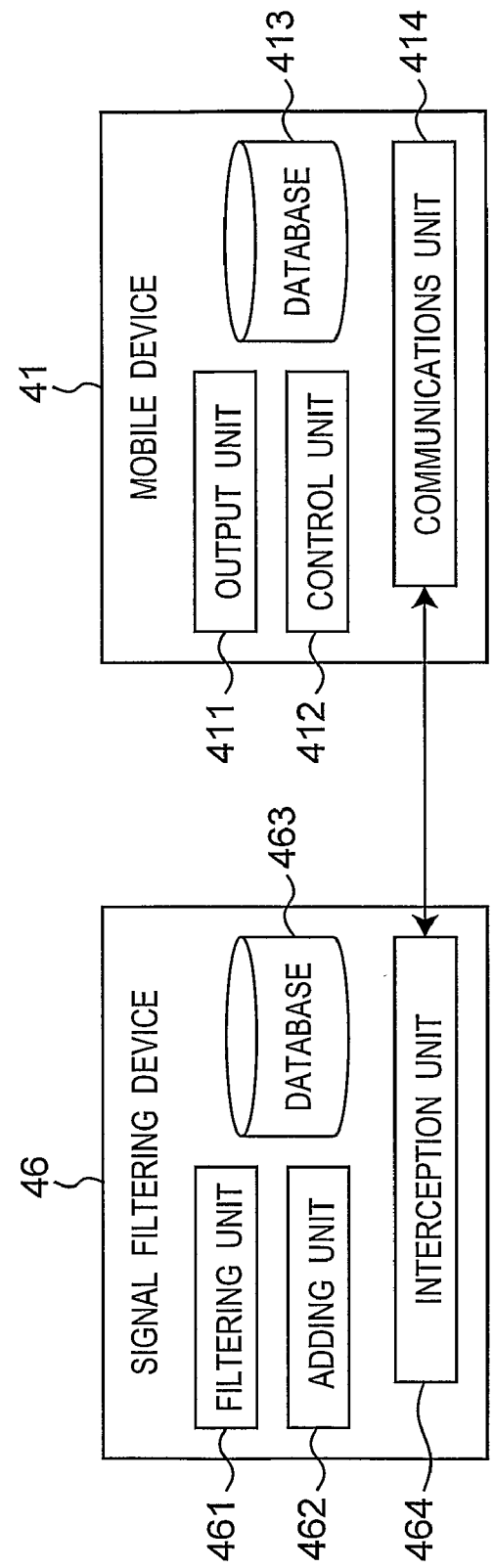
FIG. 5 is a system architecture diagram to illustrate the implementation of the present invention, which includes a signal filtering device and a mobile device.

With further reference to FIG. 5, the signal filtering device 46 in the present invention is adapted for intercepting signals about to enter the predetermined area 3 so as to change the ring mode of the mobile device 41 located in the predetermined area 3, and includes a filtering unit 461, an adding unit 462, a database 463, and an interception unit 464. The database 463 provides various ring mode information, and, according to contents of a signal, the adding unit 462 retrieves a specific ring mode from the database 463 and adds it to the signal.

The filtering unit 461 is used to execute the following functions. First, the filtering unit 461 is used to receive external signals, e.g., VoIP communication signals, sent from the interception unit 464. Second, the filtering unit 461 is used to determine the type of the signal, such as whether the signal is a communication signal. Furthermore, if the filtering unit 461 determines the signal to be a communication signal, the signal is sent to the adding unit 462 so that the adding unit 462 can generate specific ring mode information to be added to the communication signal. In addition, if the filtering unit 461 determines the signal to be a non-communication signal, the signal is directly sent to the interception unit 464.

The adding unit 462 is used to generate the specific ring mode information according to ring mode settings data stored in the database 463 after receipt of the signal from the filtering unit 461, and to add the specific ring mode information to the signal for subsequent transmission to the interception unit 464. In addition, the adding unit 462 is further used to add authentication information to the signal such that when the signal passes the verification by the mobile device 41, the mobile device 41 can use the specific ring mode as the ring mode thereof upon receipt of the signal.

The interception unit 464 is used to execute the following functions. First, the interception unit 464 is used to send the signal to the filtering unit 461 after receipt of the external signal from the network. Second, if the interception unit 464 receives the signal from the filtering unit 461, it will send the same to the mobile device 41. Furthermore, if the interception unit 464 receives the signal containing the specific ring mode information from the adding unit 462, it will send the same to the mobile device 41.

With reference to FIG. 5, when the mobile device 41 of this invention is located in the predetermined area 3, it can be used to receive signals entering the predetermined area 3. The signal filtering device 46 intercepts the signal prior to its entry into the predetermined area 3 and, according to the contents of the signal, determines whether it is necessary to add a specific ring mode to the signal. If the signal has the specific ring mode, the mobile device 41 located in the predetermined area 3 can use the specific ring mode as the ring mode thereof upon receipt of the signal. The mobile device 41 includes an output unit 411, a control unit 412, a database 413, and a communications unit 414. The database 413 is used to provide the ring mode information required by the control unit 412.

The output unit 411 is used to output the corresponding ring mode according to the contents of the signal received by the control unit 412.

The control unit 412 is used to execute the following functions. After receipt of the signal from the communications unit 414, the control unit 412 will determine whether a specific ring mode is present in the signal. If a specific ring mode is present in the signal, the control unit 412 will send the specific ring mode to the output unit 411 to enable the output unit 411 to output the ring mode accordingly. On the contrary, if a specific ring mode is not present in the signal, the input unit 411 will retrieve the original ring mode from the database 413 for output.

The communications unit 414 is used for receiving the signal sent from the signal filtering device 46 and for sending the same to the control unit 412.

Figure 6:
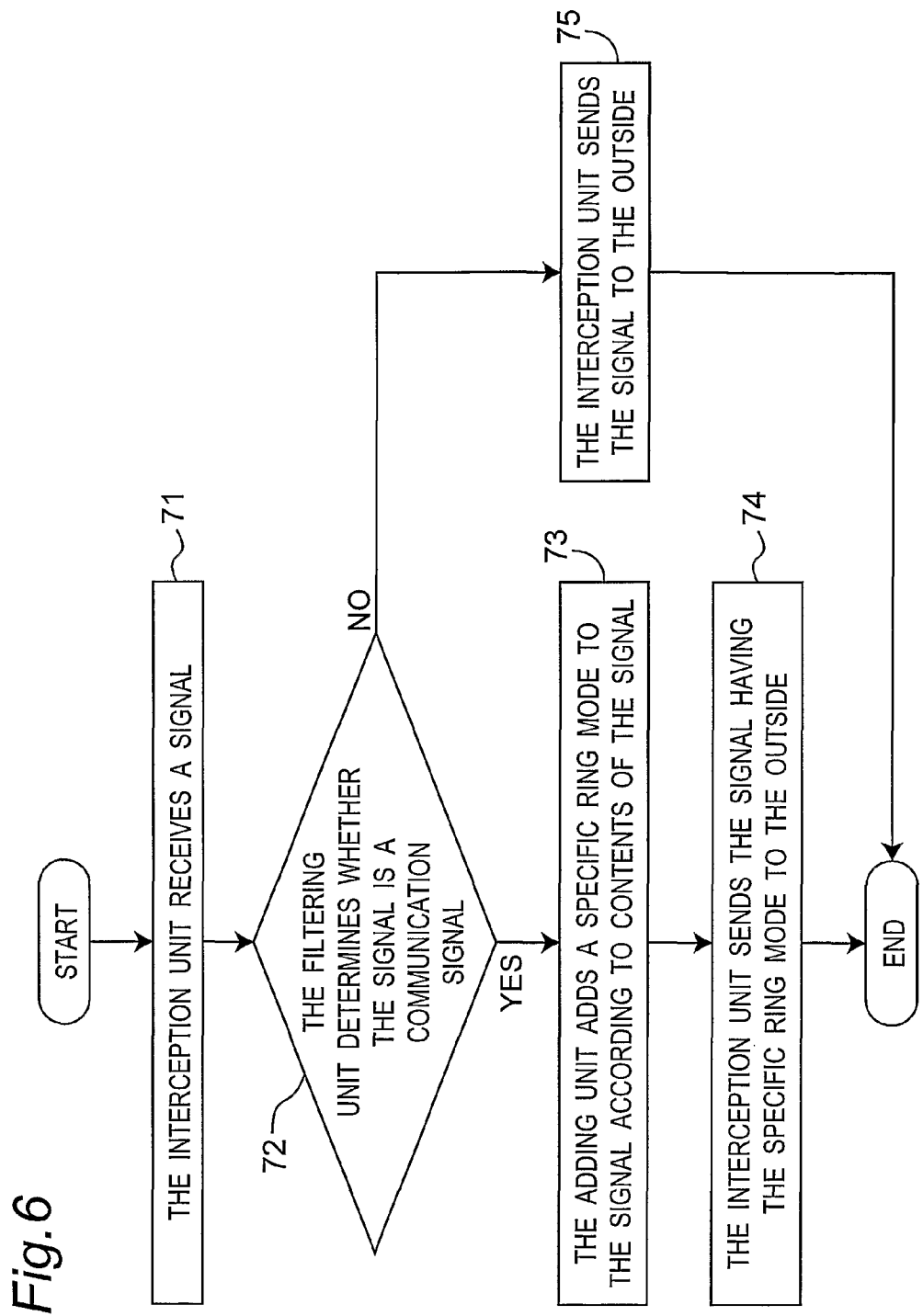
FIG. 6 is a flowchart to illustrate the preferred embodiment of an operational flow of the signal filtering device.

With reference to FIG. 6, a preferred embodiment of the operational flow of the signal filtering device 46 includes the following steps. Initially, in step 71, the interception unit 464 intercepts an external signal about to enter the predetermined area 3, and sends the signal to the filtering unit 461. Then, in step 72, the filtering unit 461 determines whether the signal is a communication signal. Using SIP as an example, step 72 is therefore a step to determine whether the signal is an INVITE message. If the determination result is positive, the filtering unit 461 sends the signal to the adding unit 462. Next, in step 73, the adding unit 462 adds the specific ring mode to the signal according to the contents of the signal, and sends the signal to the interception unit 464. Subsequently, in step 74, the interception unit 464 sends the signal having the specific ring mode to the outside. Conversely, if the determination result in step 72 is negative, in step 75, the filtering unit 461 sends the signal directly to the interception unit 464, and the interception unit 464 sends the signal to the outside.

With further reference to FIG. 7, the preferred embodiment of the operational flow of the mobile device 41 includes the following steps. Initially, in step 81, the communications unit 414 receives a signal, and sends the signal to the control unit 412. Then, in step 82, the control unit 412 determines whether a specific ring mode is present in the signal. If the determination result is positive, in step 83, the output unit 411 makes an output based on the specific ring mode sent from the control unit 412. Conversely, if the determination result is negative, in step 84, the output unit 411 retrieves the original ring mode from the database 413 for output as the ring mode.

It is noted that the signal intercepted by the signal filtering device 46 of this invention can be every communication signal issued by the originating mobile device 11 in the above-described preferred embodiment, and aside from the ring mode, i.e., the silent vibration mode, carried therein, the signal may also be one sent from other sources, such as a fire alarm signal. In that case, the specific ring mode carried in the fire alarm signal can be other types of ring modes, such as a much louder ringing sound, so as to alert the callee 41 that there is a fire.

In sum, the method for intercepting signals so as to change the ring mode of the mobile device 41 according to the present invention, as well as the device applying the same, utilizes an interception mechanism to intercept any signal about to enter the predetermined area 3, and adds a specific ring mode to the intercepted signal so as to enable the mobile device 41 to use the specific ring mode as the ring mode thereof upon receipt of the signal. The mechanism of the present invention can be easily incorporated into existing network architectures, such as an access point, a router, a hub, a gateway, or a proxy server, so as to be realized in various forms.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

INDUSTRIAL APPLICABILITY

The present invention can be applied to method and apparatus for intercepting signals to change the ring mode of a mobile device.

The invention claimed is:

1. A method for intercepting signals so as to change a ring mode of a mobile device in a wireless communication network, comprising:
   intercepting a signal about to enter a predetermined geographic area;
   according to contents of the signal, adding a specific ring mode to the signal;
   sending the signal having the specific ring mode to a mobile device located in the predetermined geographic area; and
   enabling the mobile device to use the specific ring mode as the ring mode of the mobile device upon receipt of the signal, wherein the contents of the signal include source information of the signal, the mobile device issuing a predetermined signal based on a request that will be intercepted by a signal filtering device after being transmitted, the signal filtering device adding the specific ring mode and authentication information of the signal filtering device to the request.

2. The method for intercepting signals so as to change the ring mode of a mobile device according to claim 1, wherein the specific ring mode is a silent vibration mode.

3. A method for intercepting signals so as to change the ring mode of a mobile device in a wireless communication network, comprising:
   intercepting a signal about to enter a predetermined geographic area;
   according to contents of the signal, adding a specific ring mode and authentication information to the signal;

sending the signal having the specific ring mode and the authentication information to a mobile device located in the predetermined geographic area;

enabling the mobile device to verify the authentication information; and when the signal passes the verification of the mobile device, enabling the mobile device to use the specific ring mode as a ring mode of the mobile device upon receipt of the signal, wherein the contents of the signal include source information of the signal, the mobile device issuing a predetermined signal based on a request that will be intercepted by a signal filtering device after being transmitted, the signal filtering device adding the specific ring mode and authentication information of the signal filtering device to the request.

4. The method for intercepting signals so as to change the ring mode of a mobile device according to claim 3, wherein the specific ring mode is a silent vibration mode.

5. A signal filtering device adapted for intercepting a signal about to enter a predetermined geographic area so as to change the ring mode of a mobile device located in the predetermined geographic area, said signal filtering device comprising:

an interception unit for intercepting the signal and sending the signal to the mobile device;

an adding unit for adding a specific ring mode to the signal such that the mobile device uses the specific ring mode as the ring mode of the mobile device upon receipt of the signal; and a filtering unit for determining whether it is necessary to send the signal to the adding unit according to contents of the signal from the interception unit, wherein the contents of the signal include source information of the signal, the mobile device issuing a predetermined signal based on a request that will be intercepted by the signal filtering device after being transmitted, the signal filtering device adding the specific ring mode and authentication information of the signal filtering device to the request.

6. The signal filtering device according to claim 5, wherein the specific ring mode is a silent vibration mode.

7. The signal filtering device according to claim 5, wherein the adding unit further adds authentication information to the signal such that, when the signal passes verification of the mobile device, the mobile device uses the specific ring mode as the ring mode of the mobile device upon receipt of the signal.

8. A mobile device adapted for receiving a signal having a specific ring mode, said mobile device in a wireless communication network comprising:

a communications unit for receiving the signal;

a control unit for receiving the signal from said communications unit and for determining whether the specific ring mode is present in the signal; and an output unit for outputting the specific ring mode, wherein the contents of the signal include source information of the signal, the mobile device issuing a predetermined signal based on a request that will be intercepted by a signal filtering device after being transmitted, the signal filtering device adding the specific ring mode and authentication information of the signal filtering device to the request.

9. The mobile device according to claim 8, wherein the specific ring mode is a silent vibration mode.

10. The mobile device according to claim 8, wherein the signal further has authentication information, said control unit further verifying the authentication information such that said output unit outputs the specific ring mode only when the authentication information of the signal passes verification of said control unit.

* * * * *

UNITED STATES PATENT AND TRADEMARK OFFICE
CERTIFICATE OF CORRECTION

| | | |
|---|---|---|
| PATENT NO. | : 8,024,011 B2 | Page 1 of 1 |
| APPLICATION NO. | : 11/915619 | |
| DATED | : September 20, 2011 | |
| INVENTOR(S) | : M. Yeh | |

It is certified that error appears in the above-identified patent and that said Letters Patent is hereby corrected as shown below:

On Title Page (87) PCT Pub. No. (Column 1, line 14) of the printed patent, change "WO2006/032338" to --WO2006/132338--.

On Title Page (30) Foreign Application Priority Data (Column 1, line 18) of the printed patent, "Jun. 6, 2005 (CN) 2005 1 0076502" should be --Jun. 6, 2005 (CN) 2005 1 0076502.3--.

On Title Page (56) References Cited, US Patent Documents, (Column 2, line 10) of the printed patent, "2006/0002349 1/2006 DEMIRHAN" should be --005 0002349 01/06/05 HAYASHI et al--.

Signed and Sealed this
Twentieth Day of March, 2012

David J. Kappos
*Director of the United States Patent and Trademark Office*

UNITED STATES PATENT AND TRADEMARK OFFICE
CERTIFICATE OF CORRECTION

PATENT NO. : 8,024,011 B2  
APPLICATION NO. : 11/915619  
DATED : September 20, 2011  
INVENTOR(S) : M. Yeh Page 1 of 1

It is certified that error appears in the above-identified patent and that said Letters Patent is hereby corrected as shown below:

On Title Page (56) References Cited, U.S. Patent Documents, (column 2, line 10) of the printed patent, "005 0002349 01/06/05 HAYASHI et al." should be --2005/0002349 01/2005 HAYASHI et al.--.

Signed and Sealed this
Twenty-fifth Day of September, 2012

David J. Kappos  
*Director of the United States Patent and Trademark Office*